(12) United States Patent
Oyasaeter

(10) Patent No.: US 8,696,012 B2
(45) Date of Patent: Apr. 15, 2014

(54) COLLAPSIBLE TRAILER

(75) Inventor: Eirik Oyasaeter, Hovik (NO)

(73) Assignee: Eirik Oyasaeter, Hovik (NO)

( * ) Notice: Subject to any disclaimer, the term of this patent is extended or adjusted under 35 U.S.C. 154(b) by 167 days.

(21) Appl. No.: 12/602,521

(22) PCT Filed: May 19, 2008

(86) PCT No.: PCT/NO2008/000173
§ 371 (c)(1),
(2), (4) Date: Sep. 2, 2010

(87) PCT Pub. No.: WO2008/147207
PCT Pub. Date: Dec. 4, 2008

(65) Prior Publication Data
US 2011/0254249 A1    Oct. 20, 2011

(30) Foreign Application Priority Data
Jun. 1, 2007    (NO) .................................. 20072801

(51) Int. Cl.
*B62D 63/06*    (2006.01)
(52) U.S. Cl.
USPC ..................... 280/491.4; 280/491.1; 280/656; 280/639
(58) Field of Classification Search
USPC .................. 280/491.4, 491.1, 656, 639, 652
See application file for complete search history.

(56) References Cited

U.S. PATENT DOCUMENTS 2,469,506 A * 5/1949 Kingdon Kerr et al. ...... 280/489
4,230,340 A * 10/1980 Wasservogel ................. 280/656
(Continued)

FOREIGN PATENT DOCUMENTS

AU    78876/81    12/1981
DK    168371 B1    3/1994
(Continued)

OTHER PUBLICATIONS

EP Decision to Grant European Patent No. 2155539 filed May 19, 2008, dated Dec. 15, 2011, 2 pages.
EP Rule 71(3) communication regarding Examining Division intending to grant European Patent Application No. 08753831.0-1268, dated Aug. 5, 2011, 17 pages.
EP Extended Search Report dated Nov. 9, 2010 for Patent Application 087539 31.0-12 68/2155539 PCT/N02008000173, dated Nov. 9, 2010, 22 pages.
Official Decision of Grant for Russia Application No. 2009149355, 11 pages.

*Primary Examiner* — Kevin Hurley
*Assistant Examiner* — Michael Stabley
(74) *Attorney, Agent, or Firm* — Conley Rose, PC

(57) ABSTRACT

A collapsible vehicle trailer consisting of a frame/cargo surface and a draw mounted to the frame/cargo surface by a hinge connection in such a manner that the draw may be folded down and pushed in underneath the frame/cargo surface, and that to the frame and/or cargo surface a hinged wheel suspension is arranged consisting of wheels, hub and spring so that the wheel with suspension may be rotated to become flush with the cargo surface, and that between wheel suspensions one or more shafts being articulated at the centre and at each side towards the wheels are disposed. One or more bars are arranged between the hinged draw and the center part/section of the shaft, whereby the bar(s), when the draw is folded backwards in underneath the cargo surface, pushes the centre part/section of shaft backwards, whereby the wheels and wheel suspensions are rotated in underneath and flush with the frame/cargo surface.

7 Claims, 5 Drawing Sheets

(56) References Cited

U.S. PATENT DOCUMENTS

| | | | | |
|---|---|---|---|---|
| 4,480,851 A | * | 11/1984 | St-Pierre | 280/656 |
| 4,746,142 A | * | 5/1988 | Davis | 280/656 |
| 4,768,806 A | * | 9/1988 | Tetreault | 280/656 |
| 5,137,297 A | * | 8/1992 | Walker | 280/414.5 |
| 6,164,683 A | * | 12/2000 | Kalman | 280/656 |
| 6,585,285 B2 | * | 7/2003 | Koch | 280/656 |
| 6,945,343 B1 | * | 9/2005 | Moreau et al. | 180/13 |
| 7,083,184 B2 | * | 8/2006 | Sawyer | 280/656 |
| 7,097,182 B1 | * | 8/2006 | Liu | 280/42 |
| 7,475,901 B2 | * | 1/2009 | Winter et al. | 280/656 |
| 7,543,842 B1 | * | 6/2009 | Fiorini | 280/656 |
| 7,584,980 B2 | * | 9/2009 | Thompson | 280/402 |

FOREIGN PATENT DOCUMENTS

| | | |
|---|---|---|
| GB | 2279624 | 11/1995 |
| NO | 163273 | 5/1990 |
| NO | 323344 B1 | 4/2007 |
| RU | 2006412 | 1/1994 |

\* cited by examiner

COLLAPSIBLE TRAILER

CROSS-REFERENCE TO RELATED APPLICATIONS

This application is a 35 U.S.C. §371 national stage application of PCT Application No. PCT/NO2008/000173, filed 19 May 2008, and entitled Collapsible Trailer, hereby incorporated herein by reference, which claims priority to Norwegian Patent Application No. 2007 2801, filed 1 Jun. 2007, and entitled Collapsible Trailer, hereby incorporated herein by reference.

STATEMENT REGARDING FEDERALLY-SPONSORED RESEARCH OR DEVELOPMENT

Not applicable.

BACKGROUND

The invention relates to a collapsible trailer.

More particularly, the invention relates to a collapsible vehicle trailer consisting of a frame and a draw mounted to the frame by a hinge connection in such a manner that the draw may be folded down and pushed in underneath a cargo surface, and that to the frame and/or cargo surface a hinged wheel suspension is arranged consisting of wheels, hub, and spring so that the wheels with suspensions may be rotated to become flush with the cargo surface, and that between the wheel suspensions, one or more shafts being articulated at the centre and at each side towards the wheels are disposed.

In the past, several solutions have been suggested for the same problem. Some of the solutions involve that only side walls/frames, draw or bottom can be folded together. Other solutions show that the trailer can be positioned on edge and that the wheels can be "hoisted up" vertically on level with the trailer box (U.S. Pat. No. 4,480,851). Still other solutions are based on the disassembly of a shaft between the wheels, and by means of a special hinging in the wheel suspension, the wheels can be manually rotated to become flush with the cargo surface after the trailer has been lifted up at the rear end. Reference is made here to the Norwegian Patent NO 323344.

Reference is also made to the patent application DK-B1-168371, the solution of which is based on the use of an axially displaceable draw pulling with it the wheel suspension by way of various connection bars. The handling and storage aspects of this solution are based on positioning the trailer on edge.

SUMMARY

Embodiments of the present invention provide a vehicle trailer which in a simple manner may be folded together to a flat package for space-saving parking and storage. I the collapsed (folded) position, the trailer is to occupy a minimum of storage space, e.g. by being able to be positioned on edge along the inside of a garage wall, etc.

Embodiments of the present invention include a collapsible trailer as set forth in the introduction of the specification, being characterized in that one or more bars are arranged between the hinged draw and the center section of the shaft, whereby the bar(s), when the draw is folded backwards in underneath the cargo surface, push(es) the center section of the shaft backwards, whereby the wheels and wheel suspensions are rotated in underneath and flush with the cargo surface.

BRIEF DESCRIPTION OF THE DRAWINGS

Preferred embodiments of the collapsible trailer are detailed in the claims. A preferred embodiment of the collapsible trailer is explained in more detail with reference to the attached drawings, in which:

DETAILED DESCRIPTION OF EMBODIMENTS

Figure 1A:
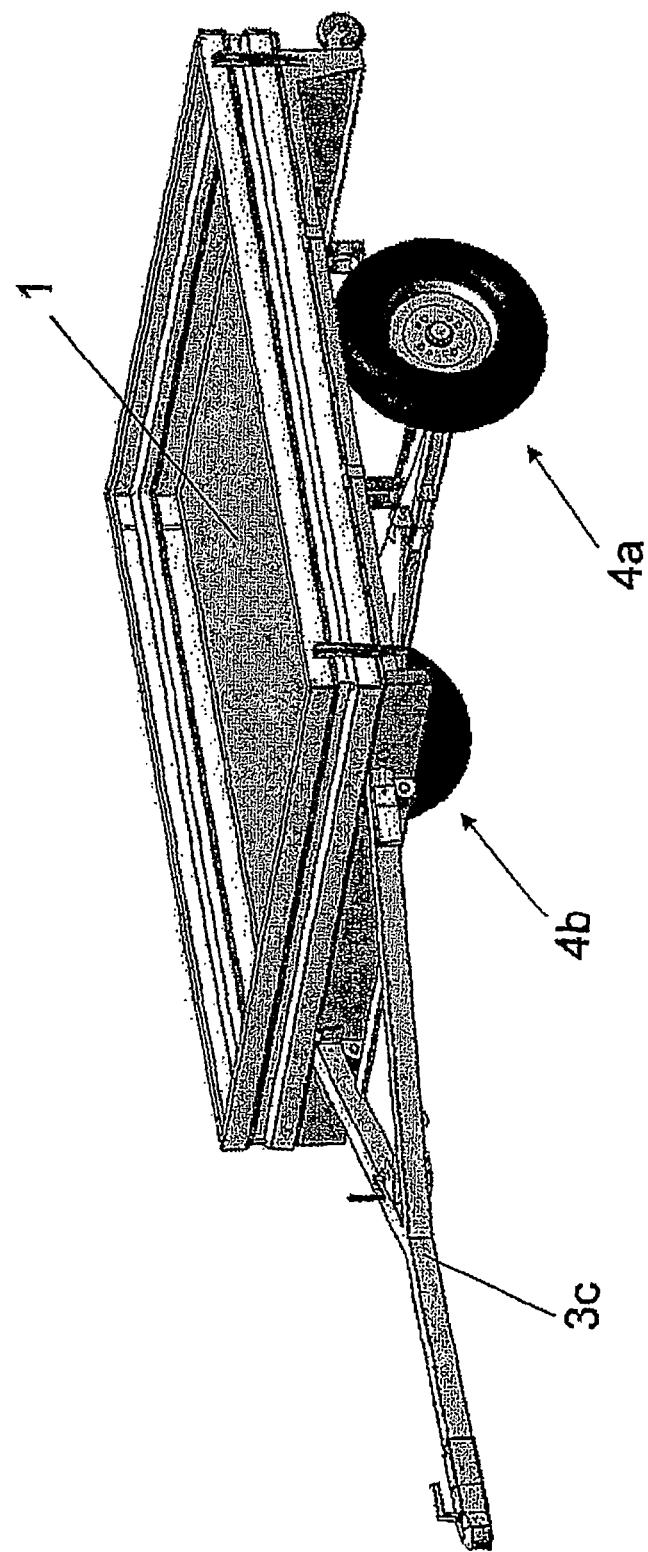
FIG. 1 *a* shows a trailer according to the invention in an operative position.
FIG. 1*b* shows the trailer before being folded together.
Figure 1B:
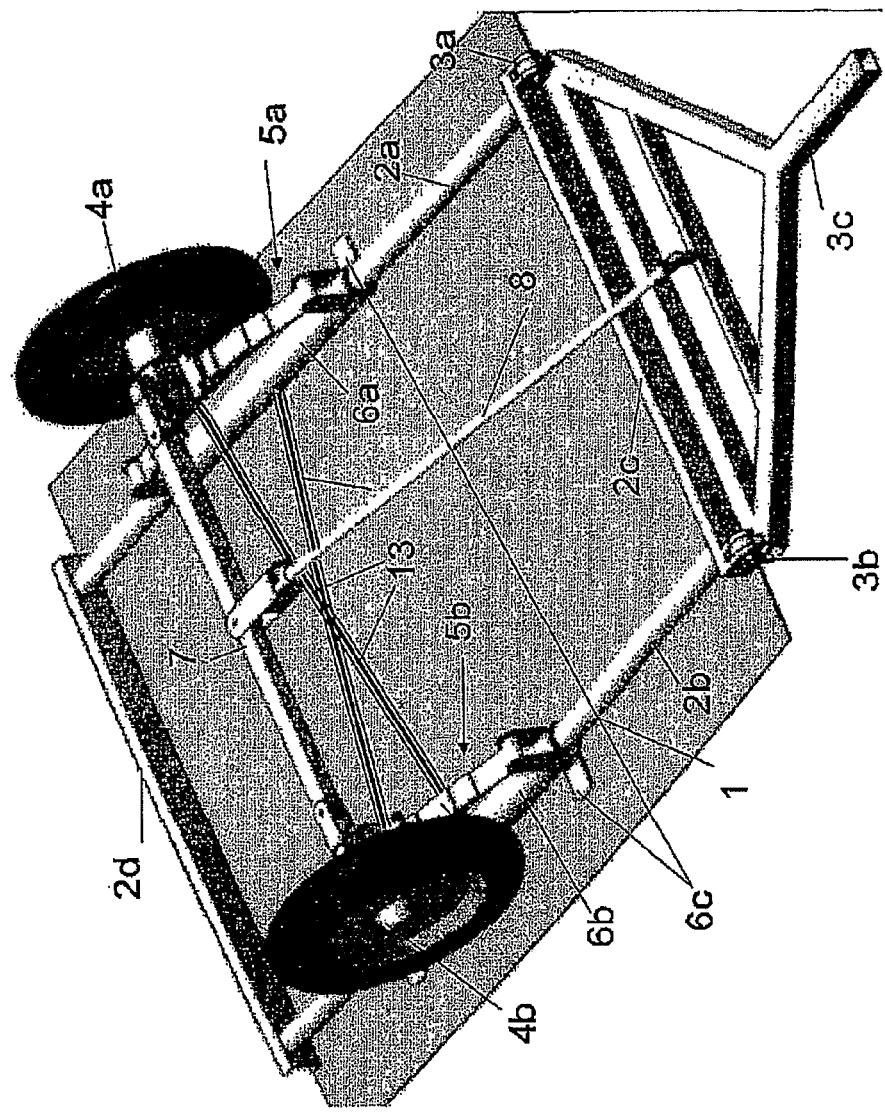
Figure 2:
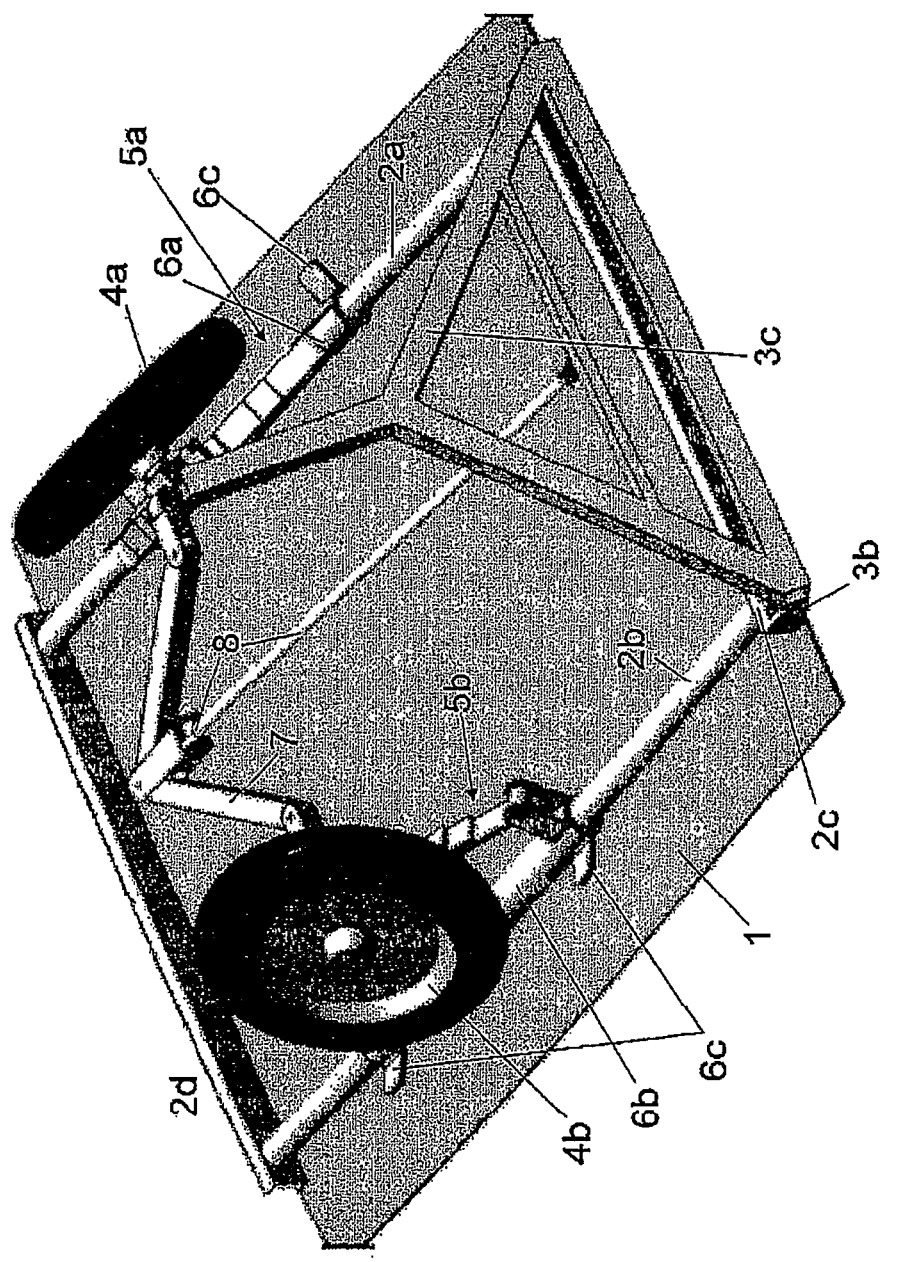
FIG. 2 shows the draw in the process of being folded down, with the subsequent automatic collapse of the wheel shaft.
Figure 3:
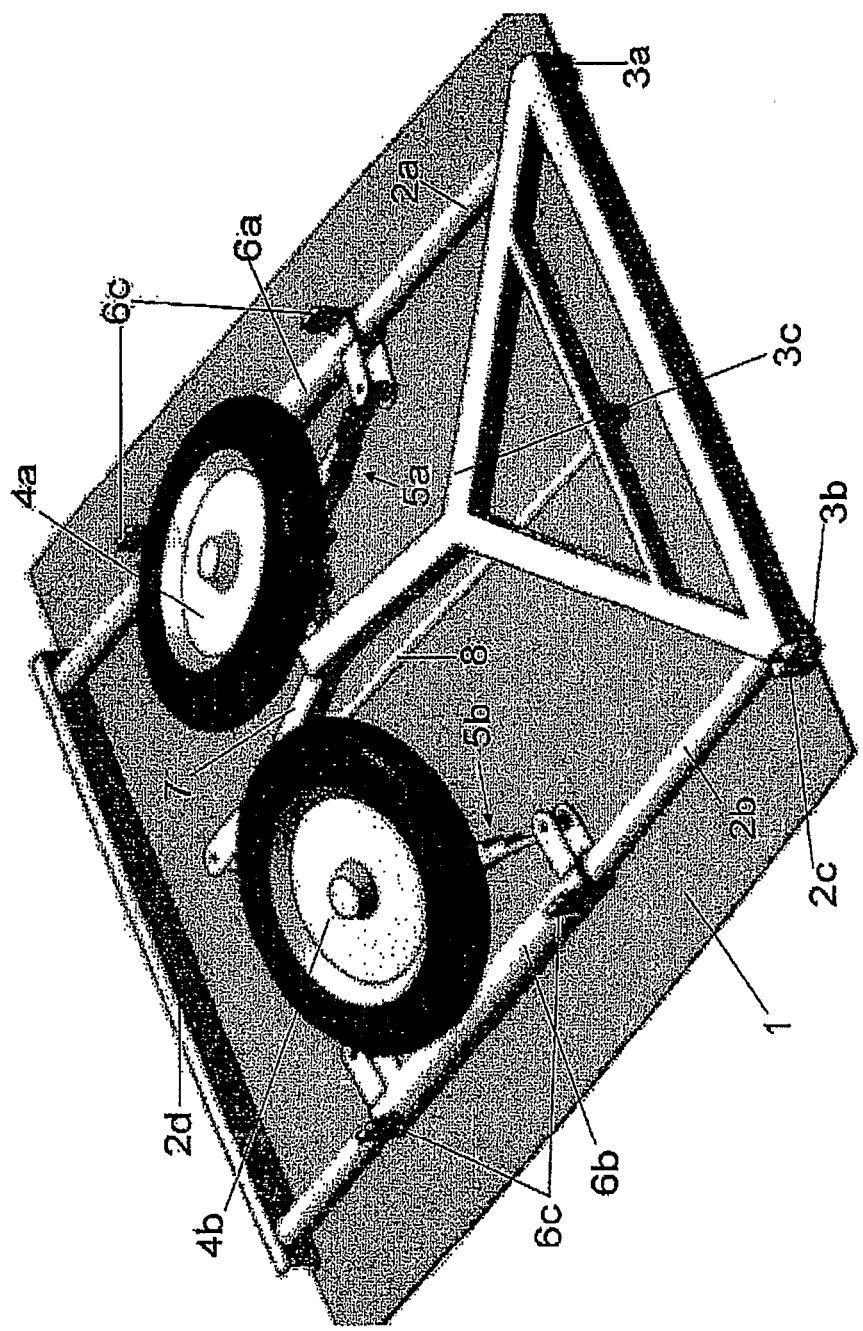
FIG. 3 shows the trailer in a fully collapsed position.
Figure 4:
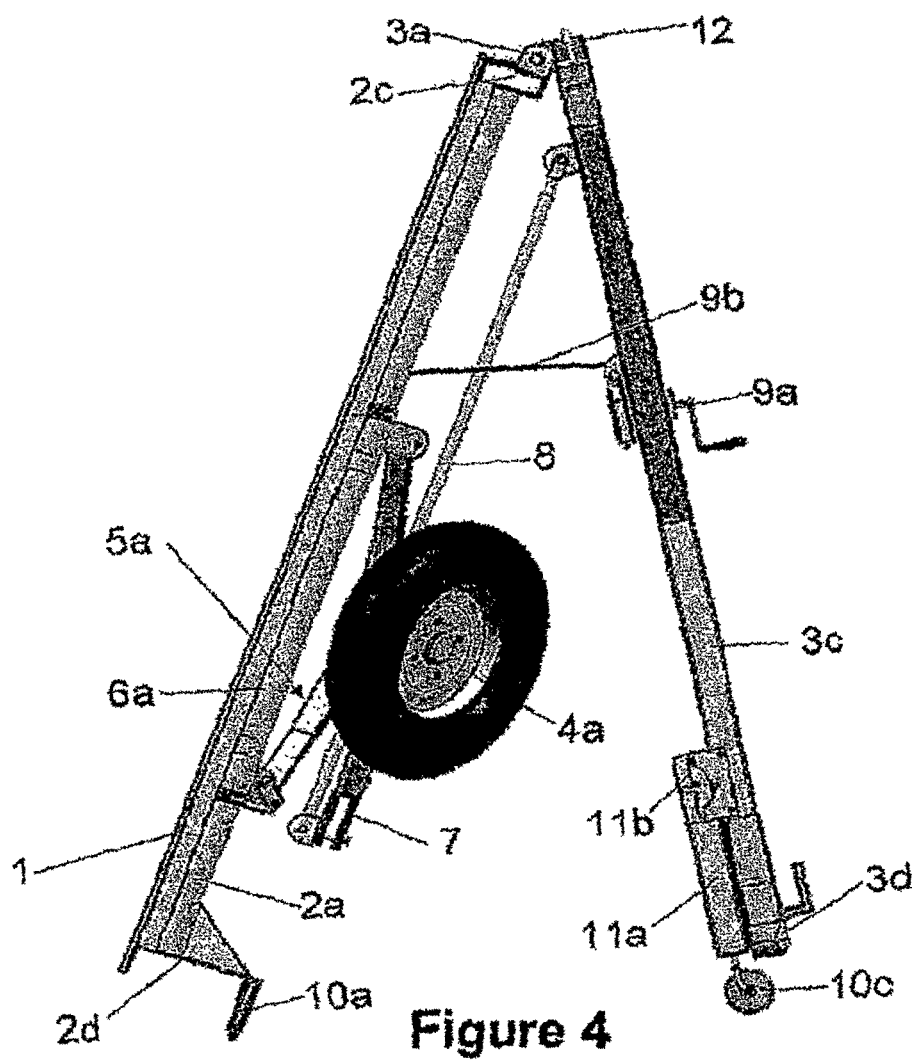
FIG. 4 shows the folding and hoisting of the trailer vertically by means of a tensioning mechanism (wire/winch/spring or the like).

The trailer is comprised of a frame/chassis 2*a*, 2*b*, 2*c*, 2*d* to which there may be mounted cargo units such as a cargo plane with or without sidewalls, or cargo devices for other objects (boats, cars, motorbikes, etc.). When sidewalls and other supports are included, these are mounted in such a manner that they may be rotated to become flush with a cargo surface 1. In this document, the term cargo surface 1 is used as a generic term for such arrangements. A draw 3*c*, 3*d* is mounted by hinging means 3*a*, 3*b* to frame 2*c*, so that the draw 3*c*, 3*d* may be folded down and in underneath the cargo surface 1. Two or more wheels 4*a*, 4*b* are mounted to a commonly known wheel suspension 5*a*, 5*b* consisting, for example, of a hub, spring, and optionally a bridge, bogie, and shock absorber. The wheel suspension 5*a*, 5*b* is attached by some form of hinging means 6*a*, 6*b* to frame 2*a*, 2*b* so the wheel 4*a*, 4*b* and wheel suspension 5*a*, 5*b* rotate inwards to become flush with cargo surface 1. A shaft 7 between wheels 4*a*, 4*b* is articulated at several places so that the shaft may be folded together and simultaneously rotated about a horizontal axis. Shaft 7 is connected to draw 3*c*, 3*d* by one or more bars 8 or the like. A tensioning mechanism (winch, wire, spring, tackle, or the like) 9*a*, 9*b* is arranged so as to act between the hinged draw 3*c*, 3*d* and the cargo surface 1 of the trailer. On the draw 3*c*, 3*d*, and at the trailing edge of the trailer, wheels 10*a*, 10*c* are provided. The wheel 10*c* of the draw is mounted in an adjustable supporting base 11*a*, 11*b* so that this wheel may be adjusted and locked in order to serve as a support wheel, auxiliary wheel for assisting in collapsing the trailer, etc. In the operative position, draw 3*c*, 3*d* may be locked to the frame 2*c* by means of intervening locking mechanisms 12. The trailer according to the present invention represents a novel manner in which to put together a trailer using a commonly known draw 3*c*, 3*d* mounted by hinging means 3*a*, 3*b* to frame 2*c*. Bar 8 or another member is attached to the draw 3*c*, 3*d* and connects draw 3*c*, 3*d* to an articulated wheel shaft 7. The joints of wheel shaft 7 allow shaft 7 to be folded and rotated in suitable movements. In the operative position bar 8 will pull on wheel shaft 7 so as to lock wheel shaft 7 in the operative position. Stoppers 6*c* will help stabilizing the wheel suspension and shaft in the operative position. One or more wires/chains 13, located between frame 2*a*, 2*b* and wheel suspension 5*a*, 5*b*, could assist in providing stability in the operative position. When draw 3*c*, 3*d* is folded down, bar 8 will push on wheel shaft 7 so that the shaft is buckled backwards. The more draw 3*c*, 3*d* is folded down and backwards, the more the articulated wheel shaft 7 will buckle. A commonly known wheel suspension 5*a*, 5*b* is rotatably mounted relative to frame 2*a*, 2*b* by means of hinging means 6*a*, 6*b*. At the same time as shaft 7 is buckled backwards and rotated about a horizontal axis, wheels 4a, 4b and wheel suspensions 5a, 5b will be forced in underneath and be flush with the cargo surface 1 of the trailer. This operation may be controlled by means of a tensioning mechanism 9a, 9b arranged so as to act between draw 3c, 3d and cargo surface 1, so that the collapse and hoisting up of the trailer to a vertical position follows automatically and without the direct use of hand power. Wheels 10a, 10b are arranged at the trailing edge of the trailer so that the trailer easily may be positioned on edge in the partially and fully collapsed positions. One or more wheels 10c are provided on draw 3c, 3d. Such wheel(s) is/are mounted on support base 11a, which may be adjusted to a desired position by means of a hinging and/or locking mechanism 11b. Wheel(s) 10c will facilitate the collapse of the trailer in that draw 3c, 3d thus may be rolled in towards the underside of the cargo surface 1 of the trailer, and vice versa when the trailer is prepared for use. A tensioning mechanism 9a, 9b in the form of a winch, wire, hook, etc. may be arranged so as to be able to be released and used as a cargo harness or tensioning means for hoisting up a boat or another load when the trailer is in use. Tensioning mechanism 9a, 9b may also be deployed so that it may be used for tilting the trailer backwards, e.g. when dumping a load.

The invention goes much further with regard to functionality than previous solutions and converts the trailer to a highly space-saving flat package in the collapsed position, while the solution of the invention at the same time provides a high utility value, ready to travel and load trailer and ensures the safety aspects of using a collapsible trailer. In contrast to the previous solutions, this trailer will be able to be put together and lifted up without the use of hand power, and will also have an advantage in terms of safety in that it is impossible to collapse the trailer and wheel suspension thereof when it is in the assembled condition and attached to a truck/towing bar.

The invention claimed is:

1. A collapsible vehicle trailer including:
   a frame;
   a draw mounted to the frame by hinging means such that the draw may be folded down and in underneath a cargo surface;
   a hinge wheel suspension arranged to the frame and cargo surface, including wheels, a hub, and a spring so that the wheels with the suspensions may be rotated to become flush with the cargo surface;
   an articulated wheel shaft disposed between the wheel suspensions and articulated at the centre and at each side towards the wheels;
   one or more bar(s) arranged between the hinged draw and the center section of the shaft, the one or more bar(s) being attached to the hinged draw and the centre of the shaft, whereby the bar(s), when folding the draw down in underneath the cargo surface, push(es) the centre section of the articulated shaft backwards, whereby the wheels and wheel suspensions are rotated in underneath and flush with the cargo surface; and
   a tensioning mechanism being arranged between the draw and the cargo surface.

2. The collapsible vehicle trailer of claim 1, wherein the hinged draw, when the trailer is being put together, is pushed towards the underside of the cargo surface so that the draw lifts the trailer to a generally vertical position.

3. The collapsible vehicle trailer of claim 1, wherein the simultaneous folding together of the trailer and lifting of the trailer to a generally vertical position may be handled using a winch or the like provided between the hinged draw and cargo surface.

4. The collapsible vehicle trailer of claim 1, wherein two or more wheels are provided at the trailing edge of the frame of the trailer.

5. The collapsible vehicle trailer of claim 1, wherein one or more wheels are provided on the draw and that the wheel(s) is/are installed in a bracket that is lockable in several positions.

6. The collapsible vehicle trailer of claim 1, wherein the joint connections at the sides of the shaft are eccentrically arranged relative to the centre of wheels.

7. The collapsible vehicle trailer of claim 1, on each side thereof, chains are arranged diagonally between the frame or cargo surface at the one end and the lower part of the wheel suspension at the opposite end.

* * * * *